United States Patent

George et al.

[15] 3,651,409

[45] Mar. 21, 1972

[54] ELECTRONICALLY TUNED ULTRA HIGH FREQUENCY TELEVISION TUNER WITH FREQUENCY TRACKING TUNABLE RESONANT CIRCUITS

[72] Inventors: John Barrett George, Indianapolis; Stephen Earl Hilliker, Mooresville, both of Ind.

[73] Assignee: RCA Corporation

[22] Filed: Mar. 23, 1970

[21] Appl. No.: 21,898

[52] U.S. Cl. ..............................325/445, 325/462, 325/468, 330/21, 330/29, 331/117 D, 331/177 V, 333/84 M, 334/15, 334/42, 334/45, 334/65

[51] Int. Cl. ..........................................................H04b 1/26

[58] Field of Search ......................................334/15, 41–45, 334/65–77; 333/73 S, 82 B, 84 M, 73 C, 82 A; 307/320; 331/117 D; 325/422, 445, 462, 468

[56] References Cited

UNITED STATES PATENTS 3,483,483 12/1969 Erler et al. ......................331/117 D X 3,419,813 12/1968 Kamnitsis ......................333/84 M UX 3,512,105 5/1970 Lance, Jr. et al. ....................334/15 X

FOREIGN PATENTS OR APPLICATIONS 1,100,751 1/1968 Great Britain............................334/15

*Primary Examiner*—Paul L. Gensler
*Attorney*—Eugene M. Whitacre

[57] ABSTRACT

An ultra high frequency (UHF) tuner includes a plurality of tunable transmission lines formed on a dielectric plate. At least two of the transmission lines are tunable over different bands of frequencies and each includes first and second conductive sections, coupled by voltage responsive capacitance devices, disposed on one surface of the dielectric plate, and a conductive ground plane disposed on the other surface overlying the first and second sections. One end of the first section of each of the transmission lines is connected to the ground plane and is shaped to provide tracking as the transmission lines are tuned across their respective frequency bands. An adjustable inductor serially connected with the variable capacitance devices also provides a tracking adjustment between the circuits.

19 Claims, 22 Drawing Figures

INVENTORS
JOHN BARRETT GEORGE
STEPHEN EARL HILLIKER
BY David E. Pitchenik
ATTORNEY INVENTORS
JOHN BARRETT GEORGE
STEPHEN EARL HILLIKER
BY David E. Petchenik
ATTORNEY INVENTORS
JOHN BARRETT GEORGE
STEPHEN EARL HILLIKER
BY David E. Fitchwick
ATTORNEY INVENTORS
JOHN BARRETT GEORGE
STEPHEN EARL HILLIKER
BY David E. Pitchenik
ATTORNEY INVENTORS
JOHN BARRETT GEORGE
STEPHEN EARL HILLIKER
BY David E. Pitchenik
ATTORNEY INVENTORS
JOHN BARRETT GEORGE
STEPHEN EARL HILLIKER
BY David E. Kitchenik
ATTORNEY

ELECTRONICALLY TUNED ULTRA HIGH FREQUENCY TELEVISION TUNER WITH FREQUENCY TRACKING TUNABLE RESONANT CIRCUITS

The present invention relates to ultra high frequency (UHF) tuners, and more particularly to tunable transmission line structure which may be tuned to desired frequencies as a function of a control voltage applied to a voltage responsive reactance device associated with the transmission line.

Currently available UHF television tuners generally include a resonant transmission line structure tuned by a parallel plate gang capacitor. The capacitors have a stator plate secured to one end of the transmission line and segmented rotor plates mounted on a rotatable tuner shaft.

Relative tracking of the tuning between the signal selection and oscillator transmission lines is provided by shaping the rotor plates of the variable capacitors. To provide tracking adjustment between the transmission lines, the segments of the capacitor rotor plates are "knifed" or bent to modify the capacitive change as the tuner shaft is rotated. In this manner, the tuner is adjusted such that a constant frequency difference is maintained between the signal selection and oscillator circuits for any given angular tuner shaft position.

In the design of a UHF tuner embodying a voltage responsive reactance device, such as disclosed in the copending application of David J. Carlson, Ser. No. 21,563, filed concurrently herewith, a particularly difficult problem was presented with respect to the tracking of the signal selection and oscillator circuits. One way to cause these circuits to track is to tailor the control voltage characteristic applied to each so that a constant frequency difference exists between the tuning of each. However, to simplify the tuning circuit it was found desirable to use matched variable capacitance diodes controlled by a single source of tuning voltage.

A tuner embodying the present invention includes a dielectric plate having two transmission lines formed thereon. Each transmission line is tunable across a different predetermined band of frequencies and includes a first and a second conductive section disposed on one surface of the dielectric plate overlying a conductive ground plane disposed on the other surface of the plate. A variable capacitance device couples the first and second conductive sections. The first section of each transmission line are both connected at one end to the ground plane, and are differently shaped or tapered such that frequency tracking obtains between the first and second transmission lines as they are tuned across their respective frequency bands.

In accordance with a feature of the present invention, an adjustable inductor is serially connected with the variable capacitance devices to provide a tracking adjustment between the circuits.

A complete understanding of the present invention may be obtained from the following detailed description of a specific embodiment thereof, when taken in conjunction with the accompanying drawings, in which.

Figure 11:
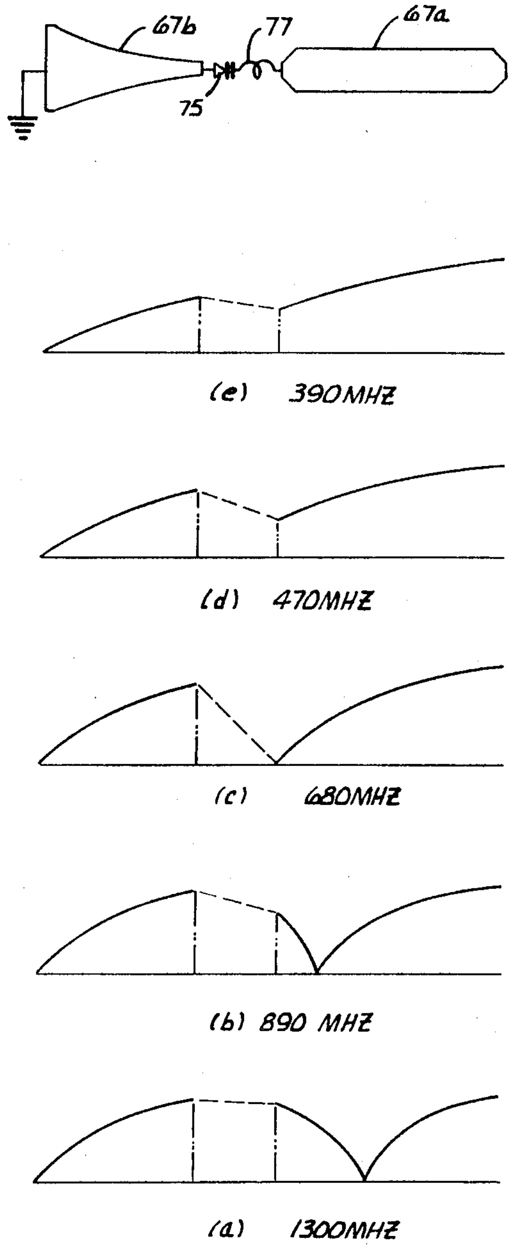

FIGS. **10*a–c*** are enlarged partial section views of the substrate showing one of the adjustable tracking inductors set for minimum, nominal and maximum inductance;

FIGS. **11*a–e*** are a series of curves showing standing voltage waves helpful in understanding the operation of the tuner;

FIGS. **12*a–e* are a series of curves showing standing waves of current corresponding to the curves shown in FIG. 11**.

Referring now to the drawings wherein like reference numerals designate similar elements in the various views, a UHF television tuner 50 is enclosed in a metal housing 52 which is maintained at a reference potential, shown as ground. The UHF tuner includes an RF amplifier stage 54, an oscillator stage 56, a mixer stage 58, and an IF amplifier stage 60. UHF television signals are intercepted by an antenna, not shown, and applied to a UHF input terminal 62. The input signals are amplified in the amplifier stage 54 and heterodyned in the mixer stage 58 with locally generated signals from the oscillator stage 56 to produce an intermediate frequency signal which is thereafter amplified in the IF amplifier stage 60 to produce an amplified intermediate frequency signal output at an IF output terminal 64.

The tuner includes four tunable resonant circuits 66, 68, 70 and 72. The tunable resonant circuit 66 is associated with the RF amplifier input circuitry, while the tunable resonant circuits 68 and 70 are part of a double tuned interstage network between the RF amplifier stage 54 and the mixer stage 58. The tunable resonant circuit 72 is used to establish the frequency of oscillation of the oscillator stage 56.

The tunable resonant circuits 66, 68, 70 and 72 include transmission line structures which are tuned by variable capacitance diodes. All of the transmission line structures include conductive elements formed on both faces of a dielectric plate. Tunable resonant circuit 66 includes aligned transmission line sections **67*a* and 67*b*; tunable resonant circuit 68 includes the transmission line sections 69*a* and 69*b*; tunable resonant circuit 70 includes the transmission line sections 71*a* and 71*b*; and finally, tunable resonant circuit 72 includes the transmission line sections 73*a* and 73*b*. One end of the second line sections 67*b*, 69*b*, 71*b* and 73*b*** is connected to the point of reference potential. Each pair of line sections cooperate with the ground plane on the opposite side of the dielectric plate to operate as transmission lines.

The two sections of each composite transmission line are coupled by variable capacitance tuning diodes 75, 79, 83 and 87 and adjustable tracking inductors 77, 81, 85 and 89, respectively. Each of the series connected variable capacitance diodes 75, 79, 83 and 87 exhibit a capacitance whose magnitude varies inversely with the magnitude of reverse bias applied across the variable capacitance diode. The tunable resonant circuits 66, 68 and 70 are apportioned to tune across a frequency band ranging from 470 MHz. through 890 MHz., while the tunable resonant circuit 72 associated with the oscillator stage 56 is apportioned to tune across a band of frequencies ranging from 517 MHz. through 931 MHz.

Each composite transmission line is apportioned so that the second sections **67*b*, 69*b* and 71*b* of the line are one quarter wavelength resonant at a frequency above 890 MHz., the highest desired frequency to which the tunable resonant circuit must tune. The first transmission line sections 67*a*, 69*a* and 71*a* are apportioned to be half wavelength resonant above the highest frequency to which the tunable resonant circuit must tune, i.e., 890 MHz. In a like manner, the second section of transmission line 73*b* associated with the oscillator tunable resonant circuit 72 is apportioned to be one quarter wavelength resonant at a frequency above 931 MHz., while the first transmission line section 73*a*** is apportioned to be half wavelength resonant above 931 MHz.

The resonant frequency of each section may be measured by electrically disconnecting the variable capacitance tuning diode and adjustable tracking inductor and thereafter coupling a unit impulse of energy into the section under investigation. The unit impulse will cause the section to ring simultaneously at several related frequencies, which can be measured, for example, by a sampling oscilloscope. The fundamental resonant frequency is the lowest frequency present in the ringing section. The mode of resonance can be determined by measuring the standing wave ratios along the section to determine the voltage maxima and null points.

Figure 1:
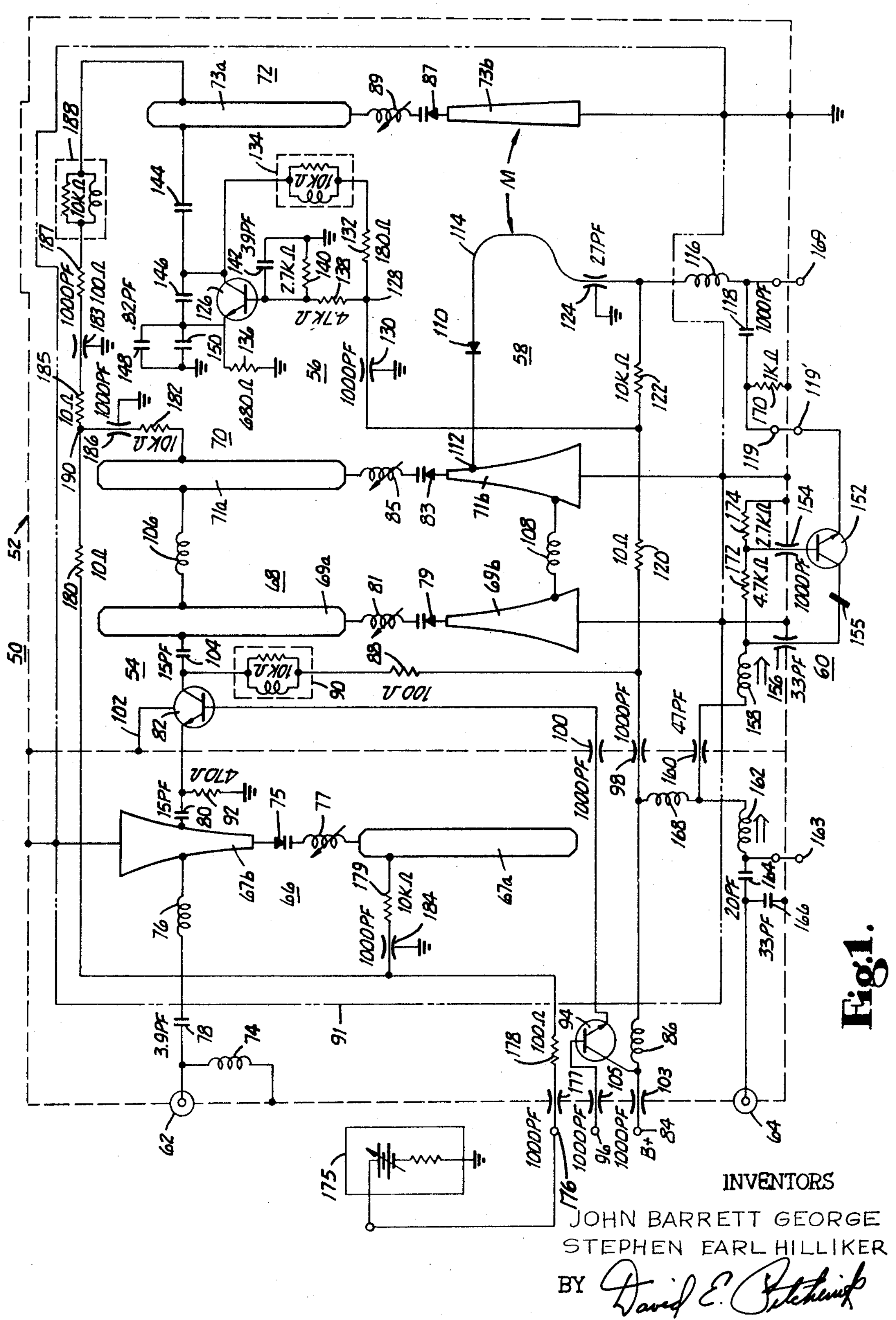
FIG. 1 is a schematic circuit diagram of a UHF television tuner embodying the present invention.
Figure 2:
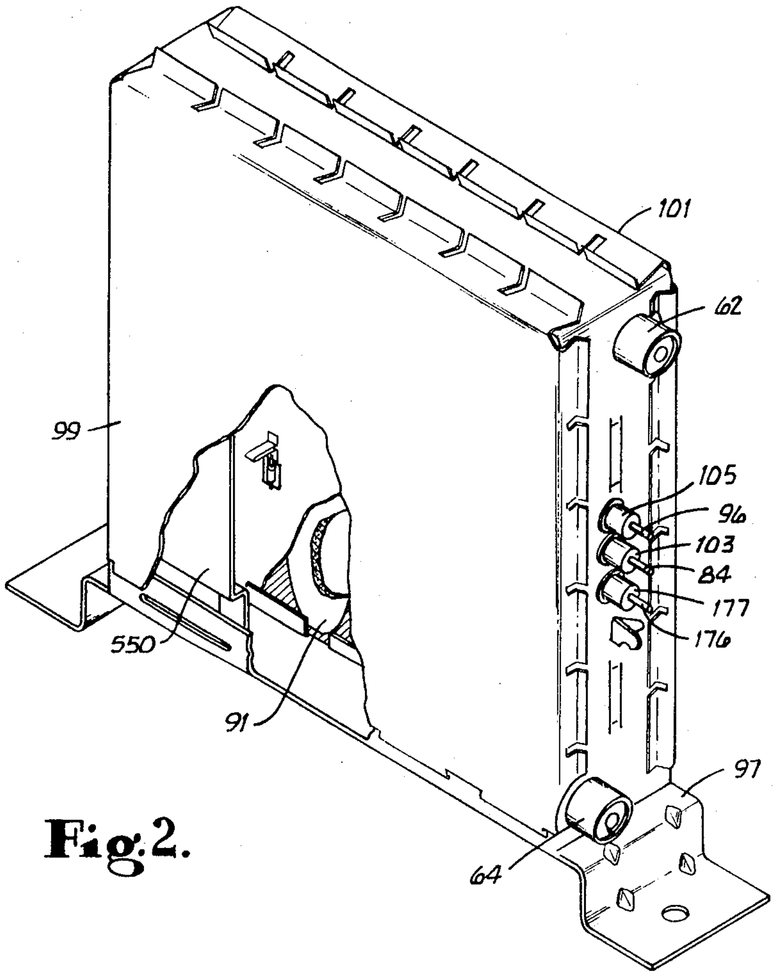
FIG. 2 is a perspective view, partially broken away, of the tuner schematically shown in FIG. 1.
Figure 3:
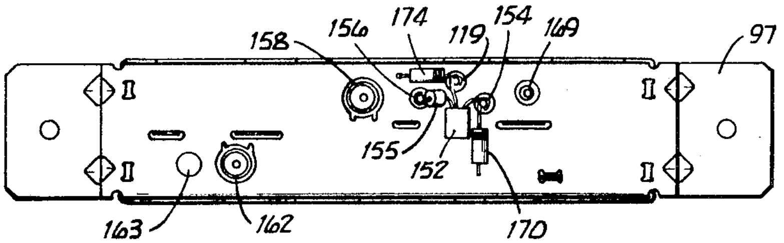
FIG. 3 is a bottom view of the tuner shown in FIG. 2.
Figure 4:
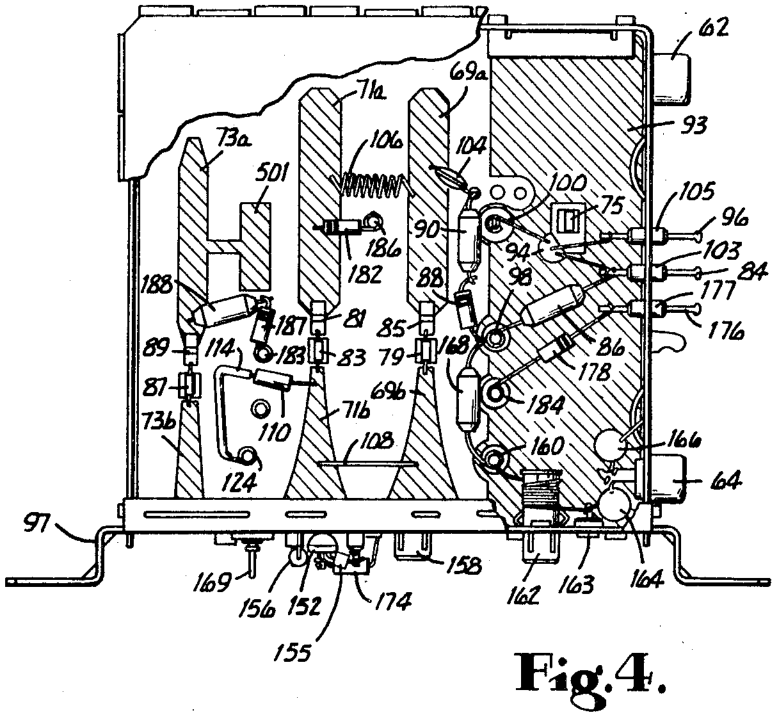
FIG. 4 is a left side view with the tuner cover and chassis frame broken away to expose the tuner components.
Figure 5:
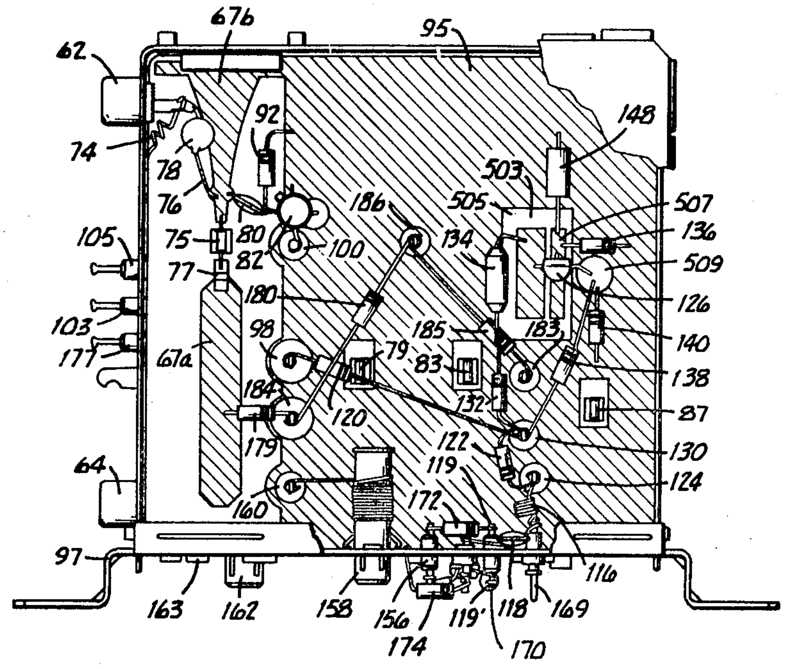
FIG. 5 is a right side view of the tuner shown in FIG. 2 with the tuner cover and chassis frame broken away to show the tuner components.
Figure 6:
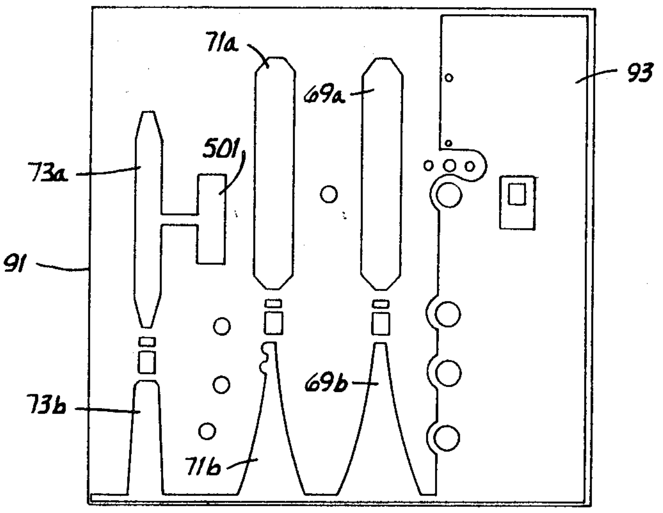
FIG. 6 is a plan view of the tuner substrate and pattern shown in FIG. 4, drawn to scale, with all the tuner components and the substrate coating material removed.
Figure 7:
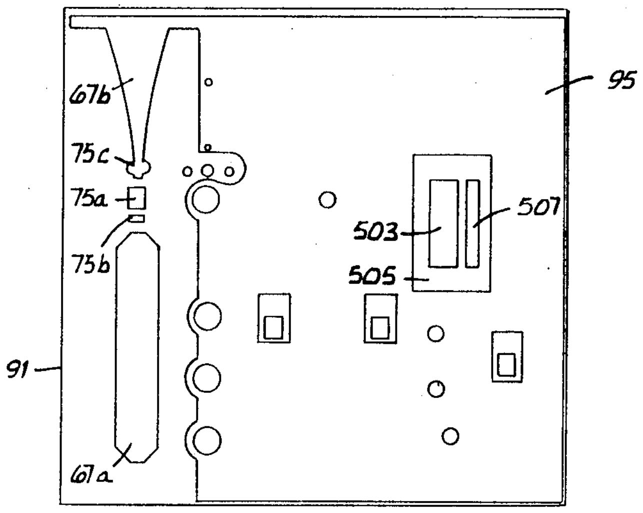
FIG. 7 is a plan view of the tuner substrate and patterns shown in FIG. 5, drawn to scale, with all the tuner components and the substrate coating material removed.

A dielectric plate or substrate 91, which supports the composite transmission lines, is mounted in a conductive enclosure (FIG. 2). The enclosure includes detachable covers 99 and 101 and a chassis or frame member 97. Two ground plane sections 93 and 95 are disposed on opposite sides of the substrate 91. The composite transmission lines 69, 71 and 73 include and are disposed opposite the ground plane section 95, while the RF input composite transmission line 67 includes and is disposed opposite the ground plane section 93. The substrate 91 and its conductive areas are shown in FIGS. 6 and 7, which are drawn approximately to scale. The substrate height is 3.375 inches and the substrate width is 3.500 inches. While the several RF composite transmission lines 67, 69, and 71 are designed to resonate at approximately the same frequency for a given diode capacitance, they differ slightly in size to compensate for the effects introduced by the different tuner components connected as shown in FIGS. 4 and 5.

The substrate 91, which is about 50 milli-inches thick, is fabricated from an aluminum oxide consisting of approximately 85 percent $AL_2O_3$ and 15 percent mixture of calcium oxide, magnesium oxide and silicon dioxide. A conductive pattern, about 0.0005 inches thick, is disposed on both the substrate faces and consists of silver and glass which has been fused at 900° C. The entire pattern is covered by a copper plating 0.0002 to 0.0005 inches thick. A moisture and solder resistant silicon, modified to harden, is applied to the entire substrate and copper plated pattern, with the exception of bonding pads used to electrically connect the tuner components to the substrate pattern. One suitable modified silicon is manufactured by Electroscience Corporation and designated 240–SB. The exposed bonding pads on the substrate facilitates rapid and accurate assembly of the tuner. In FIGS. 2, 4 and 5, the conductive sections on the substrate (the transmission line sections, the ground plane sections, and the capacitor plates associated with the oscillator circuit) are shown crosshatched to indicate the insulative coating which normally covers these components has been removed.

Figure 8:
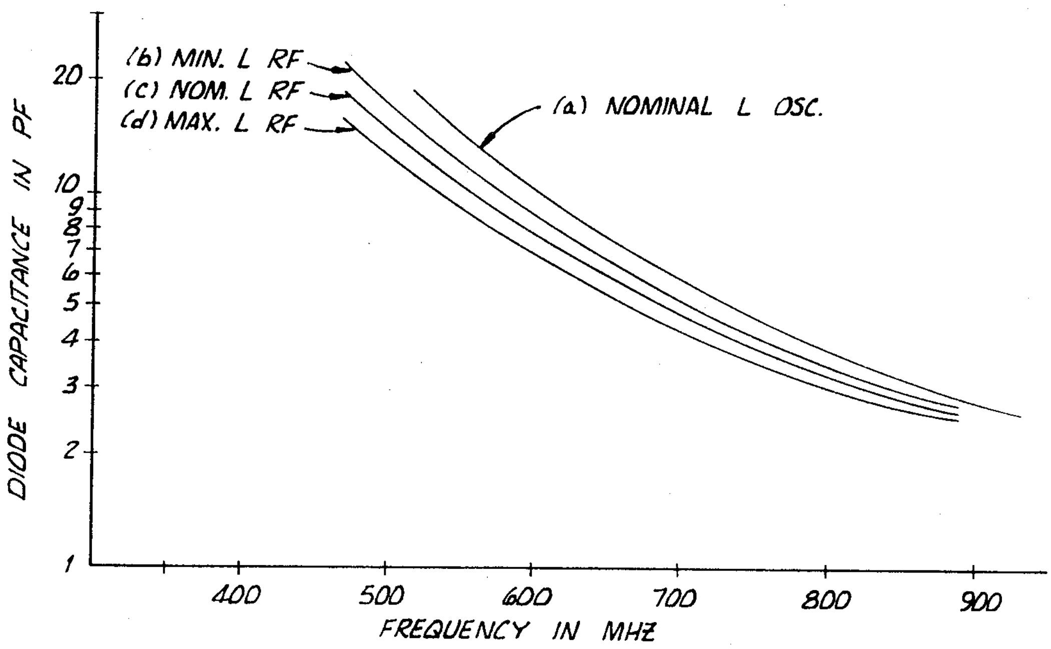
FIG. 8 is a series of curves showing plots of tuning capacity as a function of resonant frequency for the tunable resonant circuits of the tuner.

Shaping of each composite transmission line section *67b*, *69b* and *71b* provides a relative tracking between the tunable resonant circuits 66, 68 and 70 and oscillator tunable resonant circuit 72. The shaping is in the form of an exponential taper between the grounded and diode ends of each section. Because of the exponential tapers, the impedance versus frequency characteristic of each of the composite transmission lines 67, 69 and 71 is modified. Consequently, the effects of a given capacitance change on tuning frequency varies across the frequency band resulting in similar curvatures for the plots of tuning capacity as a function of resonant frequency for the RF tunable resonant circuits 66, 68 and 70 and the oscillator tunable resonant circuit 72. The similar curvatures are shown in FIG. 8 wherein curve "*a*" represents the plot of tuning capacity as a function of resonant frequency for the oscillator tunable resonant circuit 72 and curves "*b*", "*c*", and "*d*" represent the plot of tuning capacity as a function of resonant frequency for the RF tunable resonant circuit 66 for different inductance settings of the adjustable tracking inductor 77, minimum, nominal and maximum. The adjustable tracking inductors will be discussed in greater detail hereinafter. Since the curvatures of the plots for the two tunable resonant circuits are similar, tracking of the resonant circuits is provided across the entire desired frequency band of each circuit.

The resonant frequency of each of the transmission lines is determined by its total reactance which includes the reactive impedances of the upper and lower aligned sections, the variable capacitance diode and the adjustable tracking inductor. The reactive contribution of the upper section varies in a nonlinear manner with frequency, while the reactive contribution of the variable capacitance diode and adjustable tracking inductor provides capacitive reactance whose magnitude is determined by the tuning voltage (identical variable capacitive diodes having the same tuning voltage impressed across them may be used in all the tunable resonant circuits). By adjustment of the tuning voltage the capacitive reactance is varied and tunes the transmission line across the band of frequencies. For proper tracking between the oscillator and RF tunable resonant circuits, the oscillator tunable resonant circuit must resonate above the RF tunable resonant circuits by a given constant amount for any given tuning voltage adjustment. The dissimilarly shaped lower sections of the RF signal selection and oscillator tunable resonant circuits cause the rate of change of the total reactance with frequency to be modified. Specifically, the lower section of each RF transmission line includes an exponential taper and the lower section of the oscillation transmission line includes a substantially linear taper. Consequently, these sections differ in rate of reactance change with frequency from each other and from their respective upper sections. This causes the total reactance of each transmission line to vary with frequency in a manner which provides tracking between the RF and oscillator tunable resonant circuits. It should be noted that the several tapered edges on the upper section of each of the transmission lines compensate for the effects of fringing of the electromagnetic and electrostatic fields at the section ends.

While shaping of the composite transmission line sections *67b*, *69b* and *71b* provides a first order relative tracking of each of the several RF tunable resonant circuits with the oscillator tunable resonant circuit, nevertheless, the tunable resonant circuits must still be aligned with respect to each other to compensate for part tolerances. That is, the plots representing the capacitive characteristic of each resonant circuit must be properly centered, frequency wise, with respect to the other tunable resonant circuits.

It has been determined that the series inductance of the lead wires of each of the variable capacitance diodes 75, 79, 83 and 87 is a significant parameter in determining the resonant frequency for a given diode capacitance, particularly at the lower end of the UHF frequency band. For example, an increase in variable capacitance diode 75 lead lengths of less than 0.1 inch results in a several picofarad reduction in capacitance required by the tunable resonant circuit 66 for it to resonate at 470 MHz. This series inductive effect provides a potential source of detuning between the several tunable resonant circuits 66, 68, 70 and 72 as well as variation from one tuner to the next. The inductive effect, however, may be controlled and utilized to provide a means for centering or aligning the tunable resonant circuits.

Figure 9:
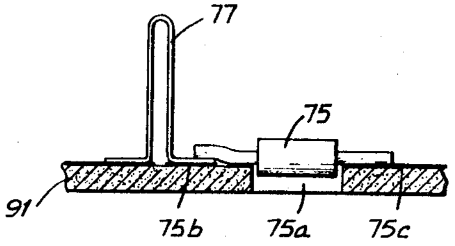
FIG. 9 is an enlarged partial section view of the substrate showing details of the tuner.

An aperture is provided in the substrate 91 for each of the variable capacitance diodes 75, 79, 83 and 87. Referring to FIG. 9 which is an enlarged partial section view of the substrate 91 showing a portion of the composite transmission line 67, variable capacitance diode 75 is positioned in an aperture *75a* in the substrate 91. The hole 75a provides a location means for the body of the variable capacitance diode 75 and permits accurate positioning of the components.

The diode 75 is secured to two bondings pads *75b* and *75c* on opposite sides of the aperture *75a*. The bonding pad *75c* is an area on the second section of transmission line while the bonding pad *75b* is a separate conductive pad. The bondings pads *75b* and *75c* are spaced a predetermined distance apart and help minimize the series inductance variations by providing a control for the lead lengths of the variable capacitance diode 75. Moreover, the aperture *75a* in the substrate material 91 reduces the dielectric adjacent the body of the diode 75 to thereby minimize the distributed shunt capacitance between the ends of the diode and also eliminates the need to bend the diode leads (increasing its inductance) during mounting of the components.

Figure 10:
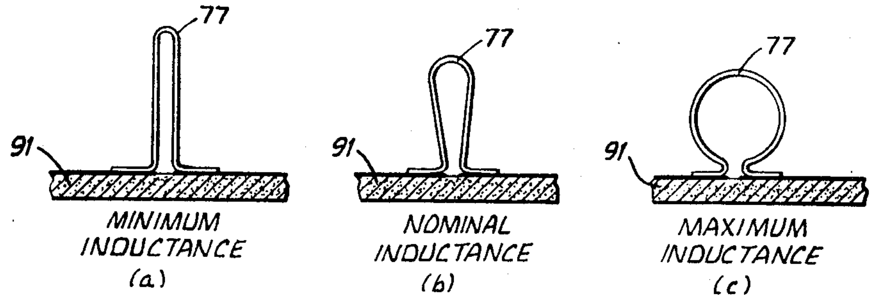

The adjustable tracking inductor 77 is connected in series between the bonding pad 75*b* and one end of the first section of the composite transmission line 67*a*. The inductor 77 consists of a thin wide strip of copper which may be adjusted to change its inductance. To change inductance, the configuration of the loop may be changed from a tall thin structure for minimum inductance to a more circular structure for maximum inductance. This is most clearly shown in FIGS. 10*a–c* where the adjustable tracking inductor 77 is shown set for minimum, nominal and maximum inductance, respectively. The series adjustable inductor for each of the composite transmission lines 67, 69, 71 and 73 swamps minor inductance variations due to the diode lead length and provides a controllable series inductive effect.

Centering of the tracking of each of the tunable resonant circuits 66, 68, 70 and 72 is obtained by adjusting the shape of the inductive loop associated with each composite transmission line. The effect of adjusting the inductor 77 is shown in FIG. 8 where the three plots of tuning capacity as a function of resonant frequency (*b*, *c*, and *d*) represent the effects of setting the adjustable tracking inductor 77 between its minimum, nominal and maximum inductance positions, respectively. The inductive loops are adjusted such that a proper constant frequency separation is obtained between the resonant frequencies of the RF tunable resonant circuits and the oscillator tunable resonant circuit across their frequency bands.

Received UHF television signals applied at the input terminal 62 are coupled through a high pass filter comprising the inductors 74 and 76 and the capacitor 78, to the RF amplifier input circuit 66. The high pass filter functions to pass frequencies within the UHF frequency band; that is, frequencies ranging from 470 MHz. to 890 MHz. The tunable resonant circuit 66 is coupled via a capacitor 80 to the emitter electrode of a grounded base transistor amplifier 82. The transistor 82 is shown encapsulated in a conductive housing which is connected to ground by lead 102 to reduce the likelihood of parasitic oscillations.

Operating potential for the transistor 82 is obtained from a source of B+ applied to a terminal 84 which is bypassed to ground for radio frequencies by a feedthrough capacitor 103. The potential is applied to the collector electrode of the transistor 82 through a radio frequency decoupling inductor 86, a resistor 88, and an RF choke 90. The choke 90 is a single component including a 10 kilo-ohm resistor providing the wire winding form for an inductor, both of which are electrically connected in parallel. The resistor reduces the figure of merit or Q of the choke to reduce the possibility of spurious parasitic resonances. The emitter electrode of the transistor 82 is connected to ground by a resistor 92 to complete the collector-emitter DC current path.

Bias to the base electrode of the transistor 82 is provided from the source of operating potential applied at the terminal 84 through the collector-emitter current path of an automatic gain control transistor 94. An automatic gain controlling potential is applied to the base electrode of the transistor 94 via a terminal 96. Terminal 96 is bypassed to ground for radio frequency signals by a feedthrough capacitor 105. The automatic gain control transistor 94 controls the base bias to the RF amplifier transistor 82, and thus, the RF amplifier stage gain. Transistor 94 is connected as an emitter-follower so that substantial isolation is provided between the automatic gain control circuits and the RF amplifier 82. Further RF isolation for the B+ supply and the AGC circuitry is provided by two feedthrough capacitors 98 and 100, respectively. The feedthrough capacitor 100 additionally provides a low impedance RF path to ground for the base electrode of transistor 82 establishing the grounded base mode of operation.

A capacitor 104 couples the collector electrode of the RF amplifier transistor 82 and the tunable resonant circuit 68. Signals developed in the tunable resonant circuit 68 are inductively coupled to the tunable resonant circuit 70 by the inductors 106 and 108. The inductor 106 provides the dominant coupling toward the lower end of the UHF frequency band, while the inductor 108 provides the dominant coupling toward the higher end of the UHF frequency band. The tunable resonant circuits 68 and 70 with the coupling inductors 106 and 108 combine to form a double tuned interstage network interconnecting the RF amplifier stage 54 and the mixer stage 58.

The mixer stage 58 includes a mixer diode 110 having its cathode connected to a tap point 112 in the tunable resonant circuit 70. The anode of the mixer diode 110 is connected by a pickup loop 114, an inductor 116 and a capacitor 118 to the input of the IF amplifier stage 60, terminal 119–119′. Inductor 116 and capacitor 118 are apportioned to transform the diode output impedance to match the IF amplifier stage input impedance. A DC bias is applied to the mixer diode 110 from the B+ supply to maintain a DC current flow of approximately 1.5 milliamperes through the mixer diode. The bias to the diode is applied from the terminal 84 through the inductor 86 and to series connected resistors 120–122, and the pickup loop 114 to the anode of the mixer diode 110. The cathode of the diode is returned to ground through a portion of the tunable resonant circuit 70.

Amplified UHF signals are applied to the mixer diode 110 from the tunable resonant circuit 70 at the tap connection 112. An oscillator wave is applied to the mixer diode from the oscillator stage 56 so that the mixer diode heterodynes the amplified UHF signals and the locally generated signal to provide a desired IF output signal. The oscillator signal is coupled from the tunable resonant circuit 72 to the pickup loop 114 connected to the anode of the mixer diode 110. A feedthrough capacitor 124 coupled between the inductive pickup loop 114 and the point of reference potential is selected to provide a low impedance path to ground for both the amplified UHF signals and the oscillator signal and a higher impedance path for IF signals. As a result, intermediate frequency signals generated in the mixer diode 110 are passed and applied to the IF amplifier stage 60 for amplification.

The oscillator stage 56 includes a transistor 126 connected as a modified colpitts oscillator whose frequency is determined by the tunable resonant circuit 72. Operating potential for the oscillator transistor 126 is provided by the B+ supply via the terminal 84, the inductor 86 and the resistor 120 to a junction 128 which is bypassed to ground for UHF waves by a feedthrough capacitor 130. The potential at the junction 128 is applied to the collector electrode of the oscillator transistor 126 through a resistor 132 and an RF choke 134. A DC emitter ground return for the transistor is provided by a resistor 136. Base bias is obtained through the voltage divider resistors 138 and 140, connected between the junction 128 and ground. A capacitor 142 connects the base electrode of the transistor 126 and ground to provide a frequency dependent signal path between the base electrode and ground.

A capacitor 144 couples the collector electrode of transistor 126 to the tunable resonant circuit 72. To sustain oscillation, a portion of the voltage developed at the collector electrode of the transistor is coupled to the emitter electrode of the transistor through a capacitive voltage divider including the three capacitors 146, 148 and 150. To permit a wide range of Gm transistors to be utilized in the oscillator stage, capacitor 148 is selected to roll off the high frequency response of the transistor. Consequently, the capacitor 148 is selected to be lossy; that is, have a frequency dependent resistive component causing resistive loading of the oscillator transistor at the higher frequencies. One suitable capacitor is an 0.82 pf., type GA, capacitor manufactured by the Stackpole Corporation.

Since tunable resonant circuit 72 includes a low impedance, alumina dielectric, transmission line, a relatively large value coupling capacitor 144 (as compared to the typical UHF television tuner high impedance air dielectric, half wave transmission line) is required for impedance matching purposes. This necessitates large capacitors in the capacitive voltage divider to provide the proper signal feedback voltages.

The capacitors 144, 146 and 150 are conductive areas formed on the substrate 91 (FIGS. 4 and 5). The capacitor 144 consists of a conductive area 501 formed over a conductive area 503 on the opposite side of the substrate within a window 505 in the ground plane 95. Capacitor 146 consists of a conductive area 503 cooperating with a conductive area 507 disposed within the window 505 adjacent area 503, and capacitor 150 consists of a conductive area 507 cooperating with the adjacent portion of the ground plane 95 to the right of the conductive area as viewed in FIG. 5. The capacitors 144, 146 and 150 may be fabricated, as other conductive areas, by printed circuit techniques. This assures that each of the several capacitances is accurately and consistently reproduced in mass production. As a result of the capacitance uniformity from tuner to tuner, the possibility of inoperative or degraded tuners due to component variations or misalignment during assembly is substantially reduced.

The oscillator tunable resonant circuit 72 exhibits an undesired resonance at about 1400 MHz. The parasitic resonant frequency is not substantially affected by the capacitance of the variable capacitance diode 87. With the component values shown, it has been found that the undesired resonant frequency changes by approximately 60 MHz. with a capacitive variation of approximately 13 pf.

It will be noted that the parasitic resonant frequency of the osicllator's composite transmission line is a second harmonic frequency centered on approximately 700 MHz. which is within the desired UHF oscillator frequency band. A reduction of fundamental frequency oscillator signal voltage is observed as the oscillator tunable resonant circuit 72 is adjusted to resonate within this vicinity. This reduces the available oscillator signal which may be coupled to the tuner mixer diode 110. It is believed that the reduction of the fundamental frequency oscillator signal voltage is due to a suck out effect caused by the parasitic circuit.

To prevent parasitic resonance and minimize the voltage reduction, the first section **73*a* of the oscillator's composite transmission line is coupled to the oscillator transistor 126 at the parasitic frequency voltage null point. This results in minimum spurious signal energy transfer from the tunable resonant circuit 72 through the coupling capacitor 144 to the oscillator transistor 126**.

As the ground plane section 95 associated with the oscillator composite transmission line is not infinite in size and conductivity, current flows in the ground plane establishing voltages. A potential coupling path is provided for coupling these voltages from the ground plane section 95 through capacitor 142 to the base electrode of the oscillator transistor. Where the current flow in the ground plane is due to the parasitic resonance, the coupling path tends to encourage the parasitic mode of resonance. This occurs because of spurious signal which is applied to the transistor base electrode establishes a base-collector electrode differential voltage which is introduced into the oscillator feedback network. To minimize this effect, the capacitor 142 is positioned on the ground plane section 95 directly over the parasitic null point on the first section of the oscillator composite transmission line.

The capacitor 142 consists of a "bare disc" 509 (FIG. 5). The disc 509 is of dielectric material having conductive areas disposed on opposite faces. The base electrode of transistor 126 is electrically connected to one of the conductive faces while the opposite conductive face is positioned on the ground plane section over the null point. By positioning the capacitor 142 in this manner, a minimum voltage gradient of spurious signal is applied across the transistor collector-base junction via the two capacitors 142 and 144 which connect these electrodes to the resonant circuit. As a consequence, the spurious voltage which is introduced in the feedback path is minimized.

As is most clearly shown in FIGS. 4 and 5, no shield walls are provided between the tunable resonant circuits of the UHF tuner 50. That is, the RF tunable resonant circuit 66, the interstage tunable resonant circuits 68 and 70, and the oscillator tunable resonant circuit 72 are not compartmentalized in conductive enclosures to prevent interaction between the several resonant circuits, and more importantly, to prevent a radiation of oscillator energy through the RF tunable resonant circuit 66 and out the UHF antenna. However, the tuner 50 is provided with a partial inner oscillator conductive cover 550 (FIG. 2) which overlies the oscillator transmission line sections **73*a*–73*b*. The inner partial cover 550, because it is permanently secured as part of the tuner chassis frame 97, minimizes possible detuning effects of distance variations between the oscillator stage 56 and detachable tuner covers 99 and 101** after removal and reattachment.

The high permeability of the alumina substrate in conjunction with the close spacing between the composite transmission lines and their associated ground plane sections confines the electromagnetic fields. Nevertheless, a fringing of the electromagnetic fields, although substantially diminished, still occurs. The fringing effect of the fields can cause the oscillator energy to be coupled to the RF tunable resonant circuit 66 to be radiated via the UHF antenna. Moreover, the coupling can adversely affect the automatic gain control characteristics of the tuner.

The undesired effects of oscillator radiation are eliminated by disposing the composite transmission line of the RF tunable resonant circuit 66 on the opposite side of the alumina substrate 91 from the double tuned interstage and oscillator composite transmission lines 69, 71 and 73. The ground plane sections 93 and 95 are, likewise, disposed on opposite sides of the alumina substrate. In this manner, the effectiveness of the electromagnetic and electrostatic coupling between the tunable resonant circuit 66 and the remaining tunable resonant circuits of the tuner 50 is minimized.

Further significant isolation between the RF tunable resonant circuit 66 and the remaining tunable resonant circuits of the tuner 50 is achieved by inverting the RF composite transmission line with respect to the interstage and oscillator composite transmission lines. Thus, the second shaped section **67*b* of the RF composite transmission line is disposed toward the top of the substrate while the first section 67*a*** of the RF composite transmission line is disposed toward the bottom of the substrate. In contrast, the oscillator and interstage composite transmission lines each have their second section disposed toward the bottom of the alumina substrate with their first section disposed toward the top.

For impedance matching purposes, the emitter electrode of the RF transistor 82 is coupled to the low impedance shaped section **67*b* of the RF input composite transmission line 67 and the collector electrode of transistor 82 is coupled to the high impedance section 69a of the interstage composite transmission line 69. By having the composite transmission lines 67 and 69 disposed in inverted relationship, as previously described, it is possible to utilize very short lengths for the RF transistor 82** emitter and collector electrode coupling leads.

The IF amplifier stage 60 includes a transistor 152 mounted external to the conductive housing 52 and connected as a grounded base amplifier. External mounting of the transistor tends to prevent an undesired interaction between the IF amplifier stage and the RF amplifier and mixer stages. The IF input signals are applied to the transistor emitter electrode, and the collector electrode is connected to the IF output terminal 64 by a double tuned IF bandpass filter. A feedthrough capacitor 154 provides a radio frequency bypass to ground for the transistor's base electrode. To minimize the effects of high frequency parasitic oscillatory circuit paths, a ferrite bead 155 is applied to the collector electrode of the transistor 82.

The first section of the double tuned IF bandpass filter includes a feedthrough capacitor 156, an inductor 158 and a feedthrough capacitor 160. The second section of the double tuned bandpass filter includes the feedthrough capacitor 160, and inductor 162 and the capacitors 164 and 166; capacitor 160, common to both filters, provides the requisite signal coupling between the sections of the filter. A standoff terminal 163 provides a small capacitance mechanical support for the junction of the inductor 162 and capacitor 164. Resistive loading of the filters (resistors 172, 174 and an IF signal cable, not shown, coupled to terminal 64) is selected so that the signal response of the IF amplifier stage 60 is flat across the entire desired IF band. That is, equal amplification of signal voltages is provided between both ends of the intermediate frequency band (approximately 41 MHz. to 46 MHz.). The shaped IF response commonly associated with television intermediate frequency amplifiers is achieved in later IF stages associated with the television receiver chassis and the VHF tuner. In the latter case, the VHF tuner may be used to provide additional amplification of the UHF tuner IF output signal.

The IF bandpass filter transforms the output impedance of the grounded base IF amplifier transistor 152 to a resistive output of 75 ohms at the center frequency of the IF band, 43 MHz. This is achieved by adjusting the tuning slugs in inductors 158 and 162 while applying an IF input signal at test point terminal 169. Although the impedance transformation provided by the bandpass filter is frequency dependent, the deviation from 43 MHz. to the upper and lower ends of the IF band is not sufficient to materially change the nature of the output impedance at the terminal 64. Specifically, the impedance at both the high end and the low end of the IF frequency band remains predominantly a resistive impedance of 75 ohms.

When the tuner IF output terminal 64 is coupled to succeeding IF amplifying stage associated with the television receiver chassis by a 75 ohm coupling cable, the impedance looking into the terminal 64 closely matches the characteristic impedance of the cable and no reflections occur back along the cable. As a result, any length of coupling cable can be used to couple signals between the television tuner and chassis. Naturally, termination of the cable on the television chassis must, likewise, be a 75 ohm resistive load. Moreover, because resistive coupling is provided between the tuner 50 and the television chassis, any capacitive variations which occur due to coupling cable dress do not detune the coupling link as there is no inductance with which the capacitance can resonate. Consequently, the dress of the IF coupling cable is not critical to proper performance of the tuner. It should be recognized that since an amplified IF output signal is provided by the tuner 50, any minor losses in the resistive coupling are not significant.

Operating potential for the IF amplifier transistor 152 is obtained from the B+ supply at the terminal 84, through the inductor 86, an RF isolation inductor 168 and the inductor 158 to the collector electrode of the transistor 152. A resistor 170 is connected between the emitter electrode of the transistor and ground to complete the DC current path. Base bias for the transistor 152 is provided by a voltage divider including the resistors 172 and 174 connected between the inductor 158 and ground.

A source of variable DC tuning voltage 175 for biasing the variable capacitance diodes associated with the four tunable resonant circuits has an internal resistance of 1,000 ohms and is connected between terminal 176 and ground. The terminal 176 is bypassed for radio frequency signals by a feedthrough capacitor 177. The tuning voltage is applied via the resistors 178 and 180 to a junction 190 which provides a common point of tuning potential for the four tunable resonant circuits. The junction 190 is coupled to the tunable resonant circuit 66 via the resistors 180 and 179 and to the tunable resonant circuit 70 via the resistor 182. The junction 190 voltage applied to the tunable resonant circuit 70 is applied to the tunable resonant circuit 68 via the inductor 106. The junction 190 is also coupled to the tunable resonant circuit 72 by resistor 185, a resistor 187 and the RF choke 188. Three feedthrough capacitors 184, 186 and 183 cooperate with the resistors 180 and 185 to prevent RF and oscillator signal energy from being coupled via the DC tuning line between the several tunable resonant circuits and into the source of tuning voltage 175.

With the component values shown, a variable capacitance diode having a capacitance range of approximately 13 picofarads will permit the RF tunable resonant circuits 66, 68, and 70 and the oscillator tunable resonant circuit to be tuned across their respective frequency bands. One suitable variable capacitance diode is the BA 141 diode manufactured by the International Telephone & Telegraph Corporation. The BA 141 diode provides a capacitance ranging from 15 picofarads to 2.3 picofarads as the tuning voltage is adjusted between approximately 1 and 25 volts DC.

Figure 12:
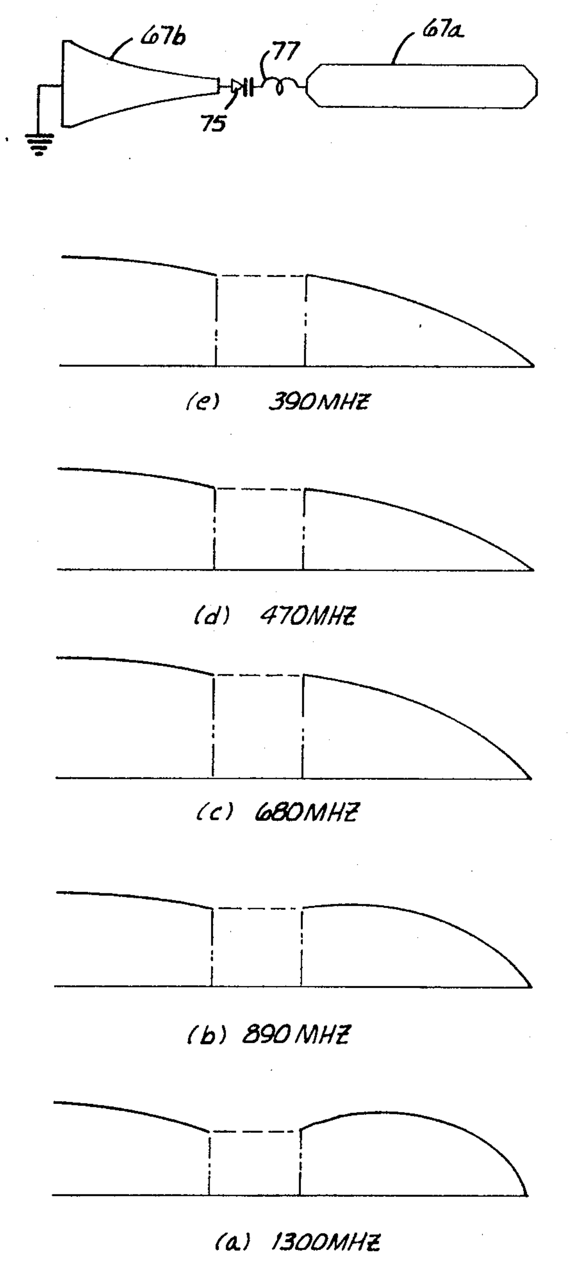

The tuning of the tunable resonant circuits (transmission lines) may be understood by reference to FIGS. 11 and 12 showing the standing waves of voltage and current, respectively, along the RF input composite transmission line 67 which is shown at the top of the FIGURES. To tune the transmission line 67 to the highest frequency within the RF UHF band (FIG. **11*b*), a voltage is applied across the variable capacitance diode 75 such that it exhibits a predetermined capacitance. This capacitance causes the composite transmission line to resonate with a voltage null on the transmission line section 67*a*** located at a point between the center and the diode end of the section.

An increase in the voltage across the diode 75 reduces the diode capacitance and causes the composite transmission line 67 to resonate at a higher frequency. The voltage null on the transmission line section **67*a* displaces toward the center of the section (FIG. 11a). A reduction in the voltage across the diode 75 increases the capacitance and causes the composite transmission line 67 to resonate at a lower frequency. The voltage null on the transmission line section 67*a*** displaces toward the diode end of the section. The amount of frequency change for a given capacitance increase is dependent upon the characteristic impedance of the transmission line which is a function of the width of the line, the spacing from the ground plane and the dielectric of the intervening medium.

As the voltage across the diode 75 is further reduced, lowering the resonant frequency of the composite transmission line, a point is reached, approximately near in the middle of the desired frequency band (FIG. **11*c*), where the diode capacitance series resonates with the inductance of the adjustable tracking inductor 77 and the transmission line section 67*b*. At this time, the voltage null on the transmission line section 67*a*** is completely displaced to the diode end of the section.

A still further reduction of the voltage across the diode 75 continues to lower the resonant frequency of the composite transmission line 67 (FIGS. **11*b* and *e*). The voltage at the diode end of the transmission line section 67*a* increases and the composite transmission line 67** resonates in a modified one quarter wavelength mode.

The positioning of the variable capacitance diode 75 away from the grounded end of the composite transmission line 67 helps maintain a high figure of merit. This is because the variable capacitance diode 75 is located at a lower current point as compared to the grounded end of the composite transmission line (FIG. 12). As a result, $I^2R$ diode losses are minimized.

At the low end of the frequency band the oscillator diode 87 has a reverse bias of approximately 1.0 volt. The oscillator voltage developed across the diode is of sufficient amplitude during a portion of each cycle to exceed the diode reverse bias causing rectification of the oscillator voltage. The rectified voltage increases the reverse bias decreasing the diode 87 capacitance. This in turn causes the tunable resonant circuit 72 to become tuned to a different frequency. No rectification occurs in the RF tunable resonant circuits 66, 68 and 70 because the RF UHF signal in these circuits is in the order of millivolts as opposed to the order of approximately 1.0 volt in the tunable resonant circuit of the oscillator. To minimize the detuning effect, the total resistance to ground from the diode 87 through the DC tuning line and the source of tuning voltage 175 is selected to be small compared to the oscillator stage driving resistance. In this manner, the tuning voltage at the terminal 176 predominates in controlling the voltage across the diode because the diode current flowing through the total resistance sets up a relatively small voltage which is insufficient to appreciably change the average DC voltage across the diode.

What is claimed is:

1. A UHF tuner comprising:

a plate of dielectric material;

a first transmission line including first and second conductive elongated sections disposed in spaced relation on one surface of said dielectric plate overlying a conductive area disposed on the other surface of said plate;

a first voltage responsive reactance device coupled between said first and second conductive sections for tuning said first transmission line over a first range of frequencies;

a second transmission line of a length different from that of said first transmission line and including first and second conductive elongated sections disposed in spaced relation on one surface of said dielectric plate overlying a conductive area disposed on the other surface of said plate;

a second voltage responsive reactance device coupled between the first and second conductive sections of said second transmission line for tuning said second transmission line over a second and different range of frequencies;

means connecting one end of the first sections of said first and second transmission lines to the respective conductive areas which they overlie on the opposite side of the plate;

one section of said first transmission line being shaped differently from the corresponding section of said second transmission line to provide different impedance-vs.-frequency characteristics for said transmission lines of values to cause said transmission lines to be tuned in tracking relation over said first and second ranges of frequencies;

control voltage input terminals for said tuner connected to said first and second voltage responsive reactance devices; and means for applying a voltage to said input terminals for controlling the tuning of said transmission lines.

2. A UHF tuner as defined in claim 1 wherein said first transmission line is longer than said second transmission line; and said first section of said first transmission line is tapered from a relatively small lateral dimension adjacent the coupling to said voltage responsive reactance device to a relatively wider lateral dimension adjacent said one end and the dimensions of the first section of said second transmission line are relatively more constant from one end to the other.

3. A UHF tuner as defined in claim 2 wherein said first and second voltage responsive reactance devices comprise variable capacitance diodes having matched frequency-vs.-capacitance characteristics.

4. A UHF tuner comprising:

a supporting plate;

a first transmission line including first and second conductive sections disposed in spaced relation on one surface of said plate overlying a conductive area disposed on the other surface of said plate;

a first voltage responsive capacitance device coupled between said first and second conductive sections for tuning said transmission line over a first range of frequencies;

a second transmission line of a length different from that of said first transmission line and including first and second conductive sections disposed in spaced relation on one surface of said plate overlying a conductive area disposed on the other surface of said plate;

a second voltage responsive capacitance device coupled between the first and second conductive sections of said second transmission line for tuning said second transmission line over a second and different range of frequencies;

means connecting one end of the first sections of said first and second transmission lines to said respective conductive areas on the opposite side of the plate;

at least one section of the first transmission line having a width which varies along the length thereof in a manner which is different from that of the corresponding section of said second transmission line; and means for applying a control voltage to said voltage responsive capacitance devices to control the frequency of tuning of said transmission lines.

5. A UHF tuner comprising:

a dielectric plate having two major surfaces;

a first transmission line tunable over a first band of frequencies including first and second conductive sections disposed on one surface of said dielectric plate opposite a conductive ground plane disposed on the other surface, and a first variable capacitance device coupling said first and said second conductive sections;

a second transmission line tunable over a second and different band of frequencies including first and second conductive sections disposed on one surface of said dielectric plate opposite a conductive ground plane disposed on the other surface, and a second variable capacitance device coupled between said first and said second conductive sections; and the shape of one of the sections of one of said transmission lines being different from the shape of the corresponding section of the other transmission line.

6. A UHF tuner as defined in claim 5 wherein said first transmission line first conductive section includes a taper.

7. A UHF tuner as defined in claim 6 wherein said taper is an exponential taper.

8. A UHF tuner as defined in claim 7 wherein said second transmission line first conductive section includes a substantially linear taper.

9. A UHF tuner as defined in claim 8 including means providing a conductive path from the widest end of the first and second transmission line first conductive section and the ground plane areas disposed opposite the respective sections.

10. A UHF tuner as defined in claim 9 wherein the band of frequencies of said circuit including the linearly tapered first conductive section extends above the band of frequencies of said circuit including the exponentially tapered first conductive section.

11. A UHF tuner as defined in claim 10 wherein said first band of frequencies ranges from 470 MHz. to 890 MHz. and said second band of frequencies ranges from 517 MHz. to 931 MHz.

12. A structure as defined in claim 11 wherein said first and said second variable capacitance devices are voltage controlled variable capacitance diodes.

13. A tunable resonant circuit tunable across a band of frequencies comprising:

a dielectric plate having a first and a second face, a portion of said plate having a dielectric discontinuity;

a transmission line including first and second conductive sections disposed on said first face of said dielectric plate on opposite sides of said dielectric discontinuity and overlying a conductive ground plane disposed on said second face of said dielectric plate;

a variable capacitance device for tuning said transmission line over a desired band of frequencies and having a first and a second electrode, said device positioned adjacent said dielectric discontinuity;

first means for connecting said device first electrode to said first conductive section, said first means including an adjustable inductor providing a tuning capacitance versus frequency response adjustment for said transmission line; and second means for connecting said device second electrode to said second conductive section.

14. A circuit as defined in claim 13 wherein said first means further includes a conductive bonding pad positioned on said first face of dielectric plate between said first and said second conductive sections, said adjustable inductor and said first device electrode electrically connected to said bonding pad.

15. A circuit comprising:

a dielectric plate having a first and a second face;

a transmission line including first and second conductive sections disposed on said first face of said dielectric plate overlying a conductive ground plane disposed on said second face of said dielectric plate; and a variable capacitor for tuning said transmission line over a desired band of frequencies and an adjustable inductor providing a tuning capacitance versus frequency response adjustment of said transmission line, said variable capacitor and adjustable inductor connected in series between said first and said second conductive sections.

16. A circuit as defined in claim 15 wherein the junction of said capacitor and said adjustable inductor is electrically connected to a conductive bonding pad disposed on said first face of said dielectric plate.

17. In a television tuner of the type wherein received television signals are heterodyned in a mixer stage with locally generated signals from an oscillator stage and including at least two tunable resonant circuits which must be tuned across different bands of frequencies while maintaining a constant frequency difference, a system comprising:

a dielectric plate having a first and a second face;

a first and a second tunable resonant circuit each tunable across a different predetermined band of frequencies, each including a first and a second conductive section disposed on said dielectric plate overlying a conductive ground plane disposed on the other plate face and a variable capacitance device for tuning the circuit across the predetermined band of frequencies serially connected with an adjustable inductor between said first and said second conductive sections; and at least one of said first and said second tunable resonant circuit first conductive sections including a taper such that frequency tracking obtains between said first and said second circuits as said circuits are tuned across their respective bands of frequency.

18. A tunable resonant circuit tunable across a band of frequencies comprising:

a dielectric plate having a first and a second face, a portion of said plate having a dielectric discontinuity;

a transmission line including first and second conductive sections disposed on said first face of said dielectric plate on opposite sides of said dielectric discontinuity and overlying a conductive ground plane disposed on said second face of said dielectric plate;

a variable capacitance device having a first and a second electrode, said device positioned adjacent said dielectric discontinuity; and first means for connecting said device first electrode to said first conductive section including a flat, thin metal loop adjustable inductor, and a conductive bonding pad positioned on said first face of said dielectric plate between said first and said second conductive sections, said adjustable inductor and said first device electrode electrically connected to said bonding pad.

19. A circuit comprising:

a dielectric plate having a first and a second face;

a transmission line including first and second conductive sections disposed on said first face of said dielectric plate overlying a conductive ground plane disposed on said second face of said dielectric plate;

a capacitor and a flat, thin wire loop adjustable inductor connected in series between said first and said second conductive sections; and a conductive bonding pad disposed on said first face of said dielectric plate, the junction of said capacitor and said adjustable inductor electrically connected to said conductive bonding pad.

* * * * *